Nov. 1, 1966     H. W. KINANDER     3,282,300
JACKETED METAL HOSE AND METHOD OF PREPARATION
Filed Oct. 16, 1963     2 Sheets-Sheet 1
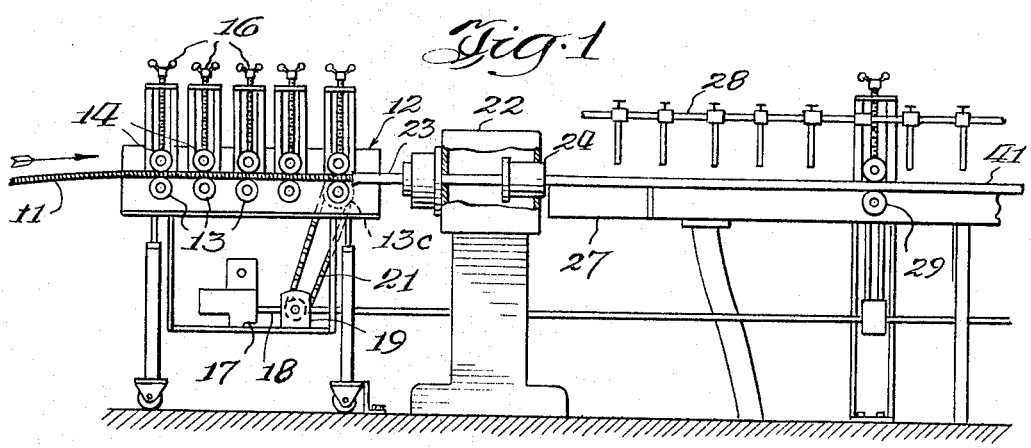
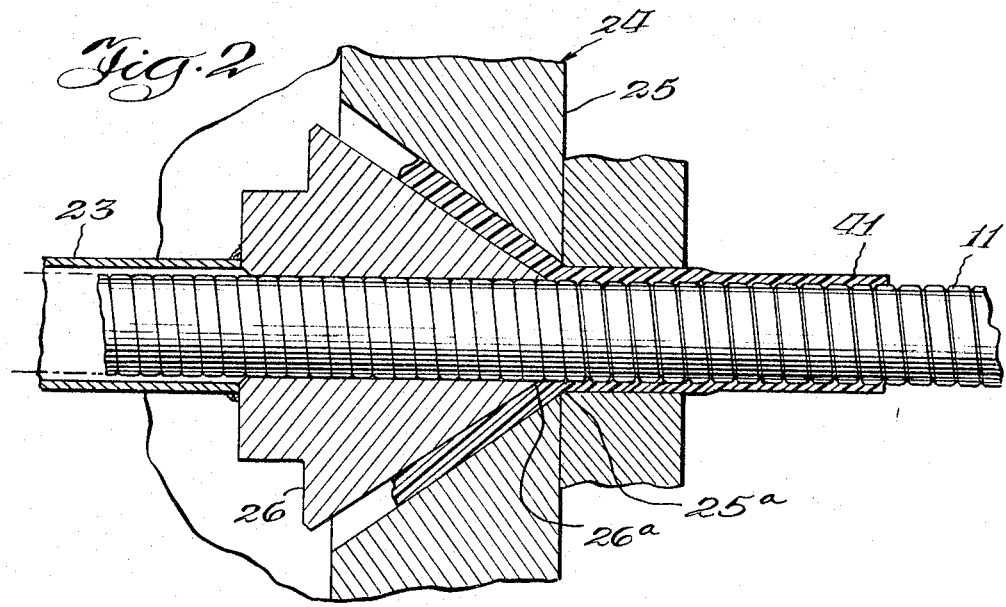
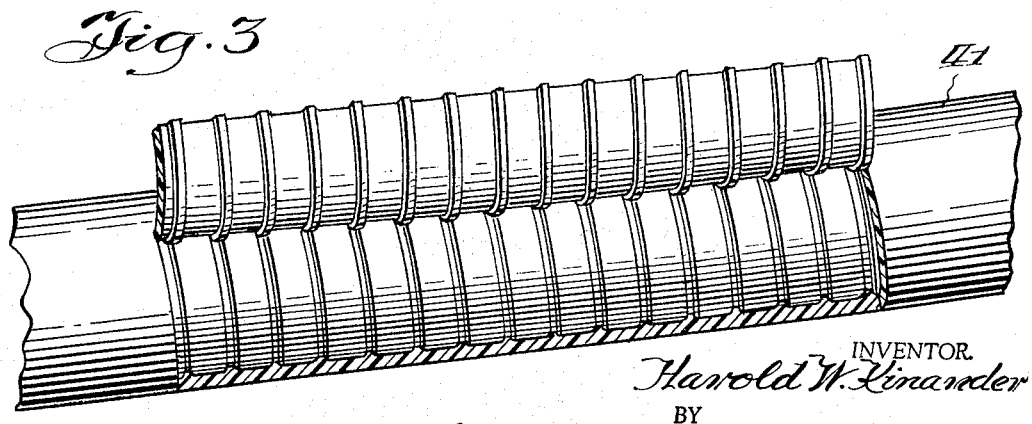
INVENTOR.
Harold W. Kinander
BY Schneider, Dunlap, Goldsmith & Clement
attorneys Nov. 1, 1966  H. W. KINANDER  3,282,300
JACKETED METAL HOSE AND METHOD OF PREPARATION
Filed Oct. 16, 1963  2 Sheets-Sheet 2

INVENTOR.
Harold W. Kinander
BY
Schneider, Dressler, Goldsmith & Clement
attorneys

United States Patent Office 3,282,300
Patented Nov. 1, 1966

3,282,300
JACKETED METAL HOSE AND METHOD OF PREPARATION
Harold W. Kinander, Roselle, Ill., assignor to Electri-Flex Company
Filed Oct. 16, 1963, Ser. No. 316,747
11 Claims. (Cl. 138—139)

This invention relates to jacketed flexible metal hose and to a method for making such hose. More particularly, it relates to a flexible metal hose of the strip-wound type having convolutions which are axially movable with respect to each other and having a seamless jacket of flexible material.

Flexible metal hose of the strip-wound type has been known for many years. Such hose is made by winding a metal strip about a mandrel and folding the strip longitudinally so that the edge portions of each convolution of the strip overlap and interlock with folded edge portions of the preceding and succeeding convolutions. There is a limited amount of freedom of axial movement in each interlock so that the hose may be axially extended from a position of minimum length in which succeeding convolutions are in contact with each other to a position of maximum length in which the convolutions are prevented from further separation by the interlocks. The ability of the convolutions to move axially provides flexibility to the hose permitting opening of the convolutions on the convex side of a bend in the hose and closing of the convolutions on the concave side.

In metal hose which contains a cord packing or a copper wire wound spirally within the overlap of the convolutions, axial extensibility of the hose is more limited, but still sufficient to provide adequate flexibility.

Flexibile metal hose of the foregoing type has been jacketed with flexible plastic material to provide protection against moisture leakage and against abrasion of the metal. Prior to this invention two types of jacketed flexible hose assemblies have been available.

In one type of assembly, the seamless plastic jacket is applied while the convolutions are spaced apart by a substantial displacement and the plastic material penetrates and substantially fills the grooves between the convolutions, forming corresponding ridges of substantial width on the inner surface of the jacket. In such assemblies axial movement of the metal hose and the jacket relative to each other is effectively prevented by the interlocking of the ridges on the inner surface of the jacket and the grooves on the flexible hose. On the other hand, flexibility is seriously impaired since the space between the convolutions on the concave side of a bend cannot readily be decreased because the space is filled with relatively incompressible jacket material from the substantial inner ridges.

In addition, hose assemblies of the type described above have pronounced grooves or wrinkles on the outer jacket surfaces due to substantial flow of plastic material inward to fill the spaces between the convolutions. Such wrinkles on the outer surface of the hose are unsightly.

In another type of prior jacketed hose assembly, the seamless plastic jacket is applied while the convolutions are completely closed and in contact with each other. In such assemblies there are no grooves of any significance between adjacent convolutions and there is no plastic flow between convolutions. The plastic jacket is smooth on both its inner and outer surfaces.

In the latter type of assembly, flexibility is achieved by freedom on the convex side of a bend for the space between convolutions to increase. There is no corresponding freedom on the concave side of a bend for the space between convolutions to decrease since the convolutions are already in contact. There is no freedom to contract in any straight portions of the metal hose to take up the added length of metal hose imparted thereto at each bend for the same reason. As a result, each bend in the hose assembly lengthens the metal hose portion thereof relative to the jacket portion. Since the jacket is not axially interlocked with the metal hose, there is a tendency in such hose assemblies for the metal hose to project out beyond its jacket at each end of a connection and thereby permit access of moisture to the interior of the assembly.

In accordance with the present invention there is provided jacketed strip-wound flexible metal hose having axially interlocking helical convolutions, said convolutions being axially movable when said metal hose is in an unjacketed state, said convolutions being spaced apart when said metal hose is in its jacketed state by a distance between about 0.20 and about 0.80 millimeters, and a seamless jacket of plastic material fitting snugly about the outer surface of said hose, the inner surface of said jacket having ridges penetrating into the interstices between said convolutions whereby relative axial movement between said metal hose and said metal jacket is prevented. In a preferred embodiment, the internal ridges of the jacket penetrate partially into the interstices between the convolutions sufficiently to fill between about 0.2 to about 0.7 of the volume of said interstices.

Hose assemblies made in accordance with one embodiment of this invention provide flexibility by permitting both expansion of the space between convolutions on the convex side of a bend and contraction on the concave side since the maximum possible displacement between convolutions is only partially taken up and since the spaces between adjacent convolutions are only partially filled with jacket material. In a hose assembly having a series of alternating bends, there is a tendency for expansions and contractions on any side of the metal hose to compensate for each other leaving the metal hose at about its original length. In cases where bends in one direction predominate over bends in the other direction there is a tendency for the metal hose to compensate for its overall extension or contraction at its bends by corresponding take-up in the reverse direction in its straight portions.

In the hose assemblies of this invention the jacket is axially locked to the metal hose by the internal ridges in the former and the external grooves in the latter. Even if the bends in the hose assembly are such that the normal take-up provisions are insufficient to compensate fully for lengthening of the metal hose relative to the jacket, the metal hose will nevertheless be locked to its jacket and will not project beyond the ends thereof. Wherever the tendency of the metal hose to extend at its bends exceeds its capacity to contract normally at its straight portions by compressing its convolutions into space in the grooves between them which is not occupied by the plastic material of the internal ridges of the jacket, then contraction in said straight portions of the metal hose beyond the normal capacity takes place by distortion of the plastic material in the internal ridges of the jacket. In addition, some compensation is achieved by the limited extensibility of the plastic jacket material. Since the jacket is axially locked to the metal hose, the lengths of the two must remain the same and there is no extension of metal hose beyond the ends of the jacket.

In addition, the jacketed hose assemblies of this invention are smooth, or at least visibly smooth on their outer surfaces since only a limited amount of jacket material penetrates inwardly between the convolutions in the metal hose, leaving little or no corresponding groove on the outer surface. Thus, the hose has no pronounced wrinkles on its external surface and is pleasing in appearance.

In accordance with the method of this invention there is provided a method of jacketing strip-wound flexible metal hose having axially interlocking helical convolutions, said convolutions being axially movable when said metal hose is in an unjacketed state, which comprises advancing said hose while maintaining adjoining convolutions spaced apart by a distance not greater than about 0.80 millimeters, extruding a jacket of plastic material about said hose as it is being thus advanced and forcing extruded plastic material to penetrate partially into the interstices between the convolutions of said hose.

In order to describe the present invention in greater detail, reference is made to the accompanying drawings in which:

FIGURE 1 illustrates schematically an assembly of apparatus suitable for carrying out the method of one embodiment of the invention;

FIG. 2 is a cross section on an enlarged scale of a portion of the extrusion head of FIG. 1;

FIG. 3 is a view on an enlarged scale of the jacketed flexible hose of this invention, with a portion of the jacket cut and peeled back to illustrate its undersurface;

Figure 4:
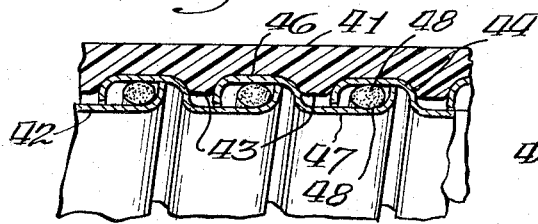
FIG. 4 is an enlarged partial cross section of the jacketed flexible metal hose made by the apparatus assembly of FIG. 1.

Referring to FIGS. 1 and 2, flexible metal hose 11 is led through pusher 12, comprising a series of pairs of rolls, all rotating at the same speed. The lower rolls 13 are driven while the upper rolls 14 rotate by frictional engagement with the hose as it moves between rolls.

The space between the upper and lower rolls of each pair is controlled by a screw 16 to adjust the frictional engagement on the hose and to permit accommodation of hoses of different diameters.

Motor 17 provides power to the rolls, acting through shaft 18, gear reducer 19, and belt 21 to drive roll 13e, the lower roll of the past pair. The remaining rolls 13 are driven from roll 13e by toothed sprocket wheels, not shown.

The linear speed at which the metal hose is propelled by the pusher may vary considerably, depending upon capacities in other segments of the equipment and depending upon the diameter of the metal hose being coated. A suitable range of speed is between about 10 ft./min. and about 160 ft./min. with the range for larger diameter hose (e.g., 4″ hose) being between about 10 ft./min. and about 40 ft./min. and with the range for small diameter hose (⅜″ hose) being about 100 ft./min. and about 160 ft./min.

In the embodiment presently described, the pusher tends to close adjoining convolutions of the hose so that they are in contact with each other as they pass into the extruder 22. However, the hose is partially opened during the extrusion process, as described in greater detail below, so that the final product has a spacing of between about 0.20 and 0.80 millimeters between adjoining convolutions. The spacing between convolutions is measured at a position where the folds of adjacent convolutions are substantially parallel to each other and perpendicular to the axis of the hose.

The metal hose propelled by the pusher passes through guide tube 23 into extrusion head 24. In the extrusion head thermoplastic material (such as a vinyl chloride homopolymer or copolymer or a rubber composition) is extruded as an annulus around the moving metal hose. The plastic material, introduced through feed means, not shown, is heated to a readily deformable plastic state and forced under pressure into the space between the die 25 and a frusto-conical mandrel 26, as shown in FIG. 2. The forward end of the mandrel 26a (in the direction of movement of the hose) terminates a short distance (e.g., about ¹⁄₁₆ to ⅛ inch) before the position 25a at which the die cavity reaches its minimum diameter. In this way, the deformable plastic, after having been shaped into an annulus in contact with the metal hose, is forced into the shape of an annulus of smaller external diameter by the wiping action of the converging die wall.

It is the wiping action of the converging die roll which forces a controlled amount of plastic material into the spaces between adjoining convolutions and, in the embodiment being described, forces the convolutions to separate from each other by a limited and controlled amount.

In a specific embodiment, a phthalate-plasticized polyvinyl chloride having a melt index of 2290 grams/10 minutes (ASTMD–1238–T), having a durometer hardness of 80 (A scale) and a specific gravity of 1.39 is extruded at a nozzle temperature of 329° F. to form a plastic coating around a ⅜″ metal hose passed through the nozzle at 138 ft./minute.

After passing through the die, the metal hose, now jacketed by soft plastic material which penetrates, at least partially, into the spaces between adjoining convolutions, is cooled by passage through cooling tray 27 in which the jacketed hose is immersed in cooling water. Water sprays from a spray pipe 28 may also be directed on the hose passing through the cooling tray.

The jacketed metal hose, while in the cooling tray, is passed through another pair of driven rolls 29, which are driven by shaft 18, but are geared to a slightly higher speed to accommodate the increased length of the hose caused by the controlled spreading of adjacent convolutions in the extruder. The jacketed metal hose thereafter passes to a winding reel, not shown, onto which it is wound for handling and shipping.

A product produced by the above described method is shown in partial enlarged cross section in FIG. 4, in which the jacket material 41 surrounds the flexible metal hose 42 snugly and is anchored by ridges 43 on its undersurface to prevent axial movement of the jacket with respect to the metal hose. The metal hose is made up of a single metal strip bent lengthwise to a S-shaped profile and wound spirally on itself so that in cross section a plurality of S-shaped elements 44 appear. Each S-shaped element comprises a convex convolution 46 and a concave convolution 47 (as viewed from the exterior of the hose), with overlap between the convex convolution of one element and the concave convolution of its adjoining element. For small diameter metal hose (e.g., from about ⅜″ to about ¾″ diameter), the metal strip is suitably a strip of about 0.356″ width before being bent into its S-shape. For somewhat larger diameter metal hose (e.g., 1″ and 1¼″ diameter), a strip of about 0.500″ width is suitable.

As the metal hose is passed into the extruder, the overlap is substantially complete so that the convex convolutions of adjoining elements are in contact with each other. During the extrusion process plastic jacket material is forced into the space between adjoining convolutions and partially opens the space as shown in FIG. 4 and thereby forms ridges 43 on its undersurface.

The metal hose, as it is initially formed is wound with a soft cotton twine 48 which is inserted during the winding process into the enclosed helical cavity between the convex and concave convolutions of adjacent elements. The twine acts as a sealing medium to help maintain gas and liquid tightness in the metal hose.

Figure 6:
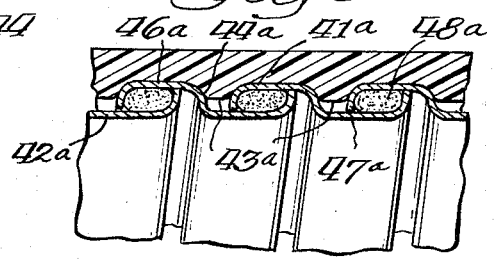
FIG. 6 is an enlarged partial cross section of jacketed flexible metal hose made by the assembly of apparatus shown schematically in FIG. 5.
Figure 5:
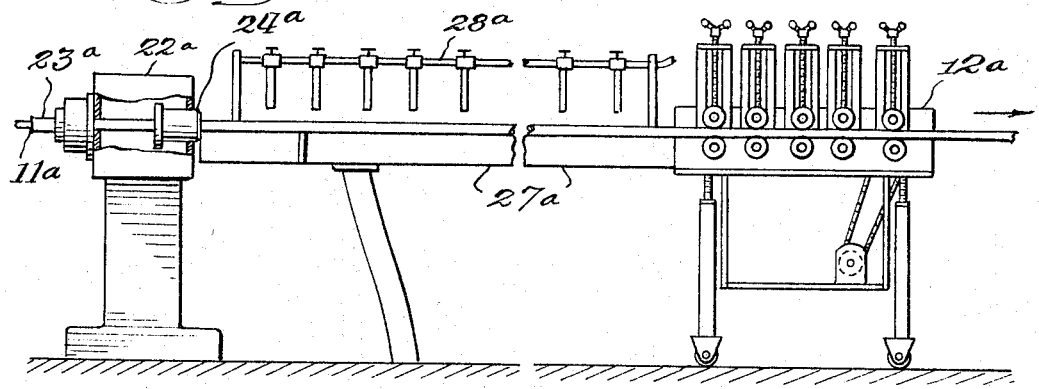
FIG. 5 illustrates schematically an assembly of apparatus suitable for carrying out the method of another embodiment of the invention.

In another embodiment, illustrated with respect to process in FIG. 5 and with respect to product in FIG. 6, the sealing twine is utilized in controlling the desired spacing between adjoining convolutions in the metal hose. In this embodiment, a larger diameter twine is used so that it substantially fills the spiral cavity between the concave and convex convolutions of adjoining elements at the dimension of said cavity corresponding to the desired external groove between convolutions. In this embodiment, the metal hose is pulled through the extruder, rather than being pushed, since the presence of the enlarged twine in the cavity prevents over-extension of the metal hose and over-widening of the grooves between convolutions.

In the embodiment of FIGS. 5 and 6, elements similar to those of FIGS. 1 and 4 are given identical numerals followed by the subscript *a*. Flexible metal hose 11*a* is led through guide tube 23*a* into extruder 22*a* and into extrusion head 24*a*, contained therein. There is no pusher before the extruder in this embodiment since it is required in the instant embodiment that the metal hose be under moderate tension, rather than compression, so that adjacent convolutions will be partially displaced from each other with openings of controlled width between them. The metal flexible hose in this embodiment is wound with an oversize twine filler 48*a* which is inserted during the winding process into the spiral cavity between the convex and concave convolutions of adjacent elements.

In a specific embodiment, the oversize twine 48*a* may be a 16 ply twine having a diameter (under 3 pound tension) of about 0.077 inch, although its width in the flattened condition shown in FIG. 5 is greater. The oversized twine fills the spiral cavity between the convex and concave convolutions of adjacent elements when said cavity is at the width necessary to leave grooves of the desired width between adjacent convex convolutions. Thus, as the flexible metal hose is pulled through the extruder under moderate tension, the oversized twine acts as a spacer to prevent over-extension of the metal hose and over-widening of the grooves.

Extrusion head 24*a* is similar to extrusion head 24 described above and has a mandrel and die structure similar to that shown in FIG. 2. As in the embodiment of FIG. 2, the thermoplastic material is wiped into the grooves between adjacent convolutions in the hose by the converging die wall.

The jacketed metal hose emerging from the extruder is passed through cooling tray 27*a* and is cooled by water sprays from spray pipe 28*a*. After being cooled, the jacketed metal hose passes into puller 12*a* which is generally similar in construction and driving mechanism to pusher 12 of FIG. 1. From the puller, the jacketed metal hose passes to a winding reel, not shown, after which it is wound for handling and shipping.

Figure 7:
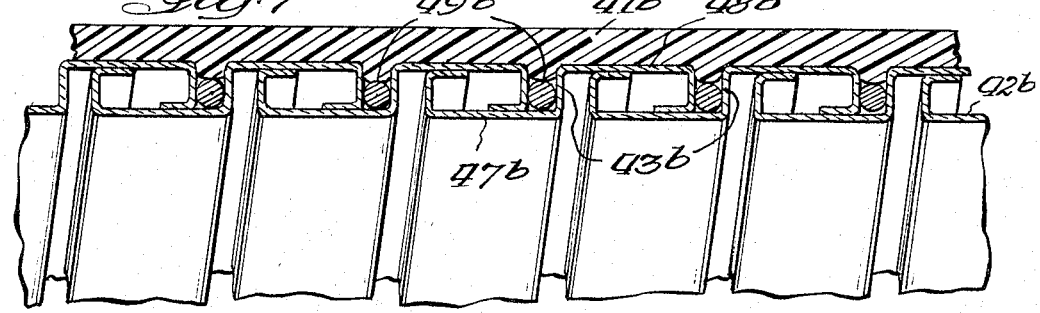
FIG. 7 is an enlarged cross section of the jacketed flexible metal hose of still another embodiment of the invention.
Figure 8:
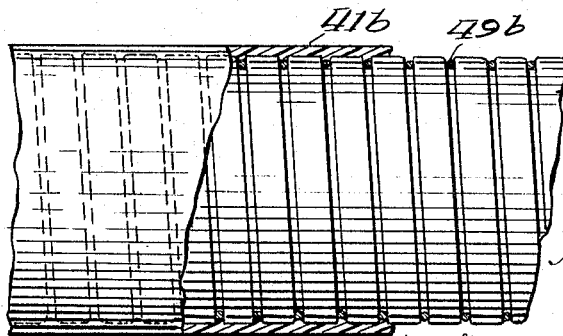
FIG. 8 is a side elevation, partially in cross section, showing the overall construction of the jacketed flexible metal hose of FIG. 7.

The embodiment of FIGS. 7 and 8 is particularly suitable for larger diameter hose, ranging from about 2 inches to about 4 inches. In this embodiment, a wide metal strip is used and the S-shaped convolutions are bent at their ends to provide an overhang in both the concave and convex convolutions. In this embodiment the desired spacing between adjacent convolutions is obtained by compression of the hose entering the extruder and by the use of a spirally wound copper wire conductor in the lower portion of the desired groove.

In the embodiment of FIGS. 7 and 8, a copper wire 49*b* which may be 21 gage (28.45 mils or 0.725 millimeters in diameter) or 23 gage (22.57 mils or 0.573 millimeters in diameter) is wound into the groove between adjacent convex convolutions of the hose. The apparatus assembly for the manufacture of the hose of this embodiment is similar to that of FIG. 1 and utilizes a pusher before the extruder so that the hose passed into the extruder is compressed to the extent permitted by the copper wire in the grooves which acts as a spacer.

The jacketed hoses of FIGS. 4 and 6 are both extensible and compressible since the internal ridges of the jacket are relatively narrow and not substantial enough to provide too much resistance to compression. In addition, there is space in the helical cavity of the hose of FIG. 4 to permit extension while the hose of FIG. 6 permits extension by the compressibility of the soft twine filler. The jacketed hose of FIGS. 7 and 8 is extensible but is not compressible in its straight portions due to the relative incompressibility of the copper wire spacer. However, limited compressibility in concave bends is possible with the hose of FIGS. 7 and 8 since the wire fills only the lower portion of the interstitial space between adjoining convolutions and the walls of the interstitial space have some freedom to converge in a bend above the level of the wire spacer.

The above detailed description of this invention has been given for clearness of understanding only. No unnecessary limitations should be understood therefrom, as modifications will be obvious to those skilled in the art.

I claim:

1. Jacketed strip wound flexible metal hose having axially interlocking helical convolutions, said convolutions being axially movable when said metal hose is in an unjacketed state, said convolutions being spaced apart when said metal hose is in its jacketed and unstressed state by a distance between about 0.20 and about 0.80 millimeters, and a seamless jacket of plastic material fitting snugly about the outer surface of said hose, the inner surface of said jacket having ridges penetrating into the interstices between said convolutions whereby relative axial movement between said metal hose and said plastic jacket is prevented and axial movement of said metal hose together with said jacket is permitted in both compression and extension.

2. Jacketed strip wound flexible metal hose having axially interlocking helical convolutions, said convolutions being axially movable when said metal hose is in an unjacketed state, said convolutions being spaced apart when said metal hose is in its jacketed and unstressed state by a distance between about 0.20 and about 0.80 millimeters, and a seamless jacket of plastic material fitting snugly about the outer surface of said hose, the inner surface of said jacket having ridges penetrating into the interstices between said convolutions whereby relative axial movement between said metal hose and said plastic jacket is prevented and axial movement of said metal hose together with said jacket is permitted in both compression and extension, said ridges penetrating said interstices sufficiently to fill between about 0.2 and about 0.7 of the volume of said interstices.

3. Jacketed strip wound flexible metal hose having a strip of S-shaped profile helically wound to produce axially interlocking convolutions, said convolutions being axially movable when said metal hose is in an unjacketed state, a twine enclosed within a helical cavity between overlapping folds of said S-shaped profile, said convolutions being spaced apart when said metal hose is in its jacketed and unstressed state by a distance between about 0.20 and about 0.80 millimeters, and a seamless jacket of plastic material fitting snugly about the outer surface of said hose, the inner surface of said jacket having ridges penetrating into the interstices between said convolutions whereby relative axial movement between said metal hose and said plastic jacket is prevented and axial movement of said metal hose together with said jacket is permitted in both compression and extension, said ridges penetrating said interstices sufficiently to fill between about 0.2 and about 0.7 of the volume of said interstices.

4. Jacketed strip wound flexible metal hose having a strip of S-shaped profile helically wound to produce axially interlocking convolutions, said convolutions being axially movable when said metal hose is in an unjacketed state, said convolutions being spaced apart when said metal hose is in its jacketed and unstressed state by a distance between about 0.20 and about 0.80 millimeters, and a seamless jacket of plastic material fitting snugly about the outer surface of said hose, the inner surface of said jacket having ridges partially penetrating into the interstices between said convolutions whereby relative axial movement between said metal hose and said plastic jacket is prevented, and the outer surface of said jacket is visibly smooth and whereby said axial movement of said metal hose together with said jacket is permitted in both compression and extension.

5. The jacketed metal hose of claim 3 wherein said helical cavity is wider in its axial direction than said twine.

6. The jacketed metal hose of claim 3 wherein said twine is substantially as wide in its axial direction as said helical cavity.

7. The method of jacketing strip-wound flexible metal hose having axially interlocking helical convolutions, said convolutions being axially movable when said metal hose is in an unjacketed state, which comprises advancing said hose while maintaining adjoining convolutions spaced apart by a distance not greater than about 0.80 millimeters, extruding a jacket of plastic material about said hose as it is being thus advanced and forcing extruded plastic material to penetrate partially into the interstices between the convolutions of said hose.

8. The method of jacketing strip-wound flexible metal hose having axially interlocking helical convolutions, said convolutions being axially movable when said metal hose is in an unjacketed state, which comprises advancing said hose while maintaining adjoining convolutions in contact with each other, extruding a jacket of plastic material about said hose as it is being thus advanced and forcing extruded plastic material to penetrate partially into the interstices between the convolutions of said hose and thereby separating said convolutions by a distance between about 0.20 and about 0.80 millimeters.

9. The method of jacketing strip-wound flexible metal hose having axially interlocking helical convolutions, said convolutions being axially movable when said metal hose is in an unjacketed state, which comprises advancing said hose while maintaining adjoining convolutions spaced apart by a distance between about 0.20 and about 0.80 millimeters, and extruding a jacket of plastic material about said hose as it is being thus advanced and forcing extruded plastic material to penetrate partially into the interstices between the convolutions of said hose.

10. The method of claim 9 wherein said hose is advanced by pulling and the distance between adjoining convolutions is maintained by a spacer twine which substantially fills the helical cavity between interlocking strips of S-shaped profile.

11. Jacketed strip wound flexible metal hose having axially interlocking helical convolutions, said convolutions being axially movable when said metal hose is in an unjacketed state, said convolutions being spaced apart when said metal hose is in its jacketed and unstressed state by a distance greater than the distance between said convolutions in compressed state and less than the distance between said convolutions in extended state, and a seamless jacket of plastic material fitting snugly about the outer surface of said hose, the inner surface of said jacket having ridges penetrating into the interstices between said convolutions whereby relative axial movement between said metal hose and said plastic jacket is prevented and axial movement of said metal hose together with said jacket is permitted in both compression and extension.

References Cited by the Examiner
UNITED STATES PATENTS

| | | | |
|---|---|---|---|
| 330,910 | 11/1885 | Levavasseur | 138—136 |
| 1,095,648 | 5/1914 | Lutz | 138—131 |
| 1,632,784 | 6/1927 | Blair | 138—135 X |
| 1,977,219 | 10/1934 | Williams | 138—139 X |
| 2,045,540 | 6/1936 | Debenedetti | 138—135 X |
| 2,145,182 | 1/1939 | Kirch | 138—136 X |

SAMUEL ROTHBERG, *Primary Examiner.*

LAVERNE D. GEIGER, C. L. HOUCK, *Examiners.*

UNITED STATES PATENT OFFICE
CERTIFICATE OF CORRECTION

Patent No. 3,282,300                      November 1, 1966

Harold W. Kinander

It is hereby certified that error appears in the above numbered patent requiring correction and that the said Letters Patent should read as corrected below.

Column 6, lines 25, 40, 58 and 75, column 7, lines 21 and 36 and column 8, line 3, after "millimeters" each occurrence, insert -- beyond the spacing of said convolutions in totally compressed position --.

Signed and sealed this 5th day of September 1967.

(SEAL)
Attest:

ERNEST W. SWIDER                      EDWARD J. BRENNER
Attesting Officer                      Commissioner of Patents